(No Model.) 4 Sheets—Sheet 1.
A. F. STOWE.
RACING MACHINE FOR CUTTING LEATHER.
No. 328,078. Patented Oct. 13, 1885.
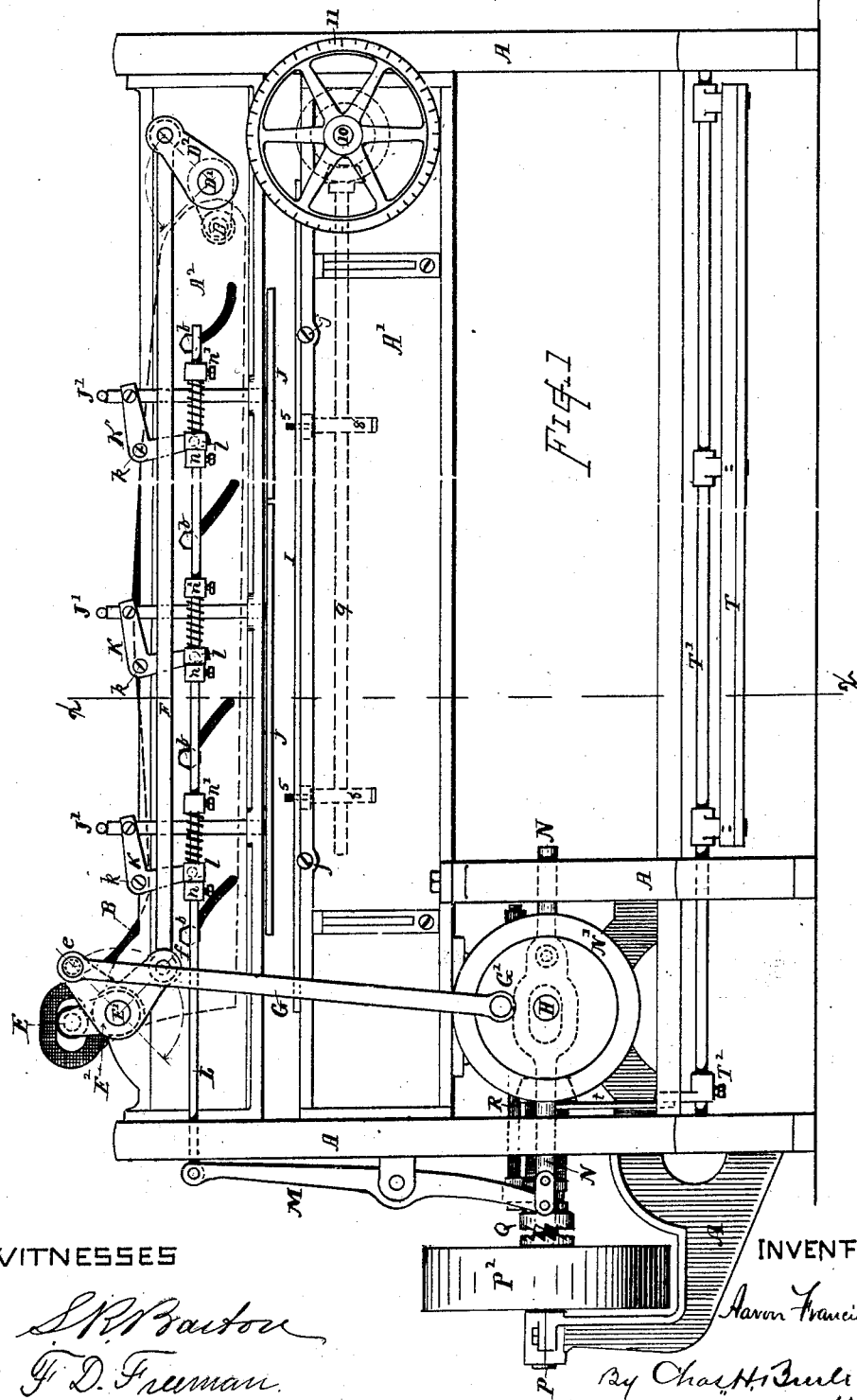
WITNESSES
S. R. Barton
F. D. Freeman
INVENTOR
Aaron Francis Stowe
By Chas. H. Burleigh
Attorney (No Model.) 4 Sheets—Sheet 2.
A. F. STOWE.
RACING MACHINE FOR CUTTING LEATHER.
No. 328,078. Patented Oct. 13, 1885.
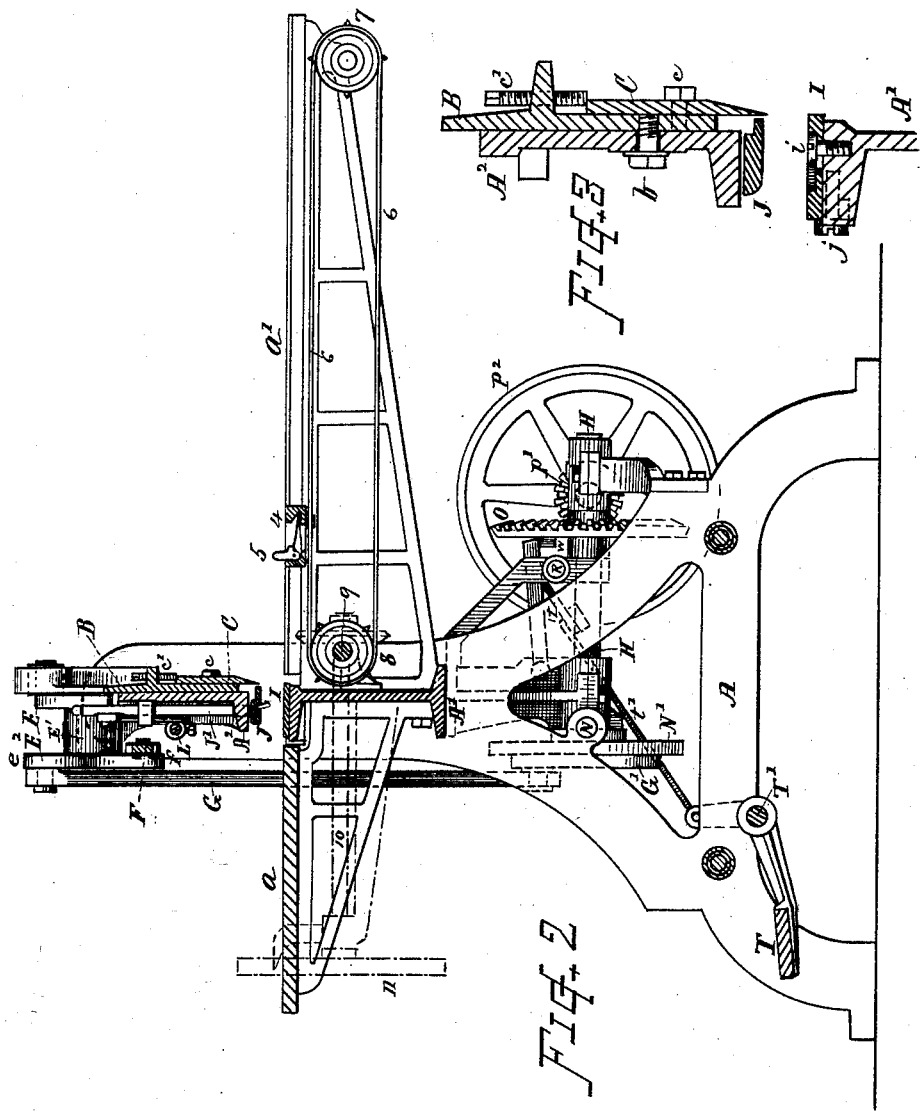
WITNESSES
S. R. Barton
F. D. Freeman
INVENTOR
Aaron Francis Stowe
By Chas. H. Burleigh
Attorney

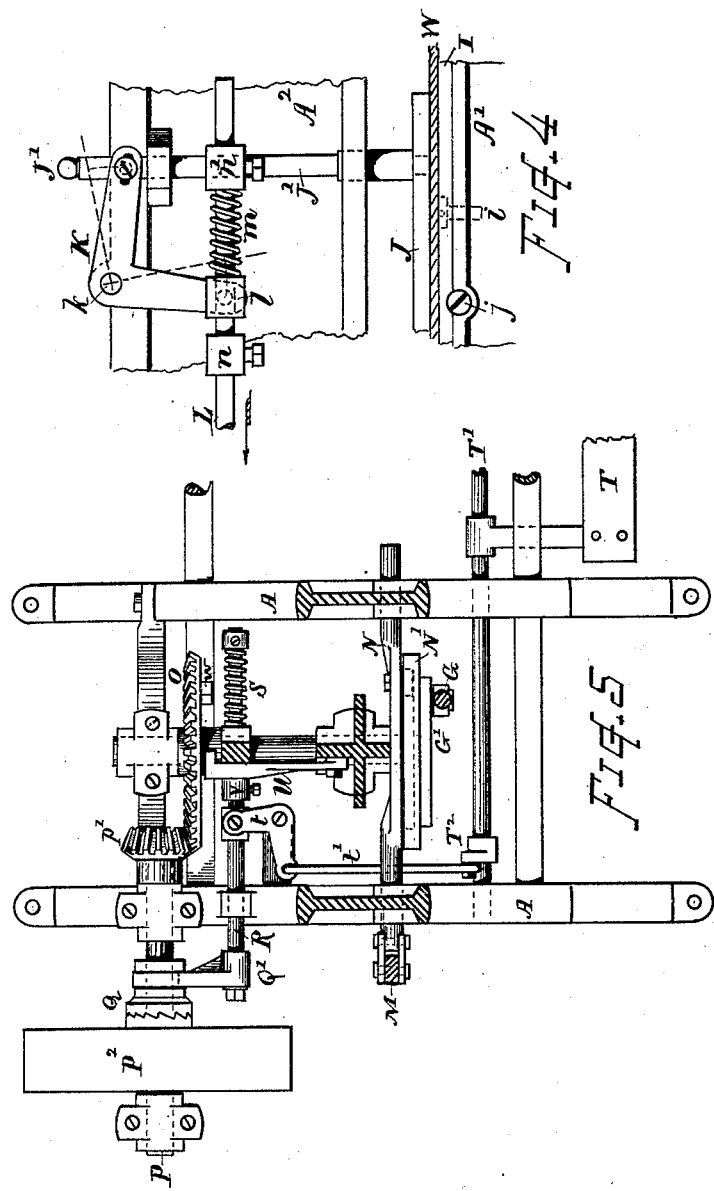

(No Model.) 4 Sheets—Sheet 4.
A. F. STOWE.
RACING MACHINE FOR CUTTING LEATHER.
No. 328,078. Patented Oct. 13, 1885.
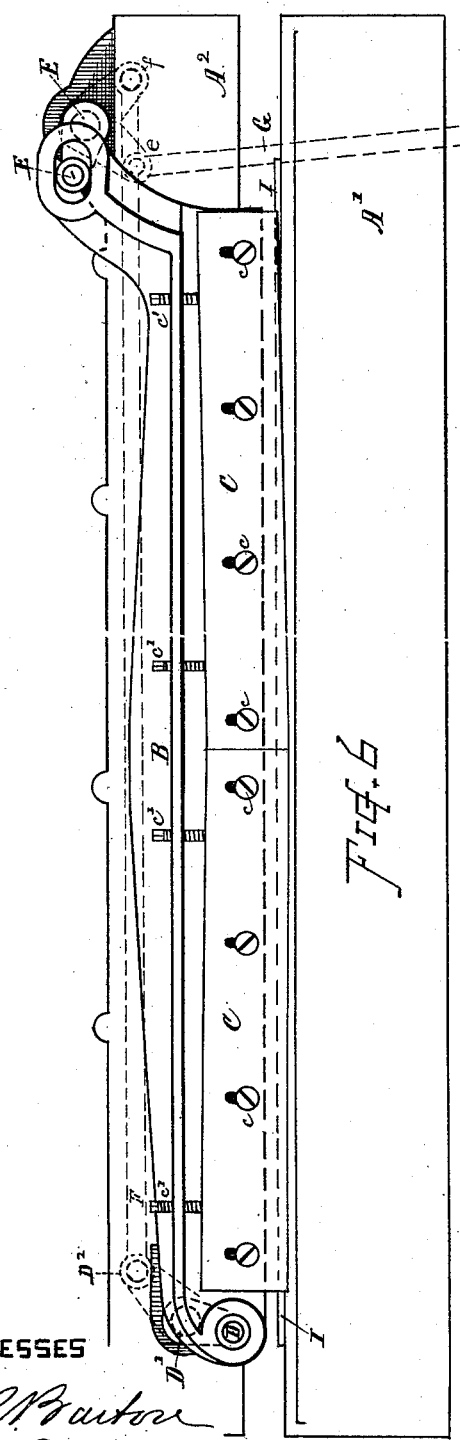
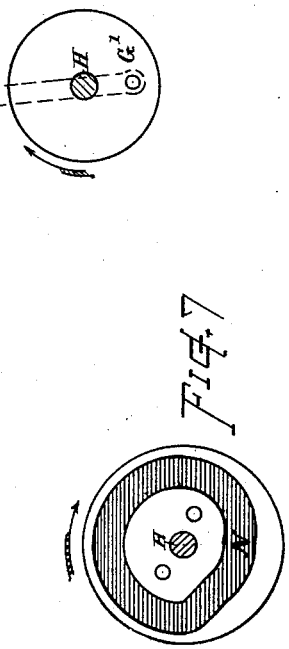
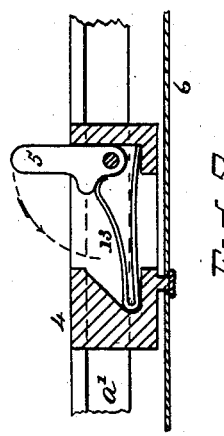
WITNESSES
INVENTOR
Aaron Francis Stowe
By Chas. H. Burleigh
Attorney

UNITED STATES PATENT OFFICE.

AARON FRANCIS STOWE, OF WORCESTER, MASSACHUSETTS.

RACING-MACHINE FOR CUTTING LEATHER.

SPECIFICATION forming part of Letters Patent No. 328,078, dated October 13, 1885.

Application filed March 7, 1885. Serial No. 158,036. (No model.)

*To all whom it may concern:*

Be it known that I, AARON FRANCIS STOWE, a citizen of the United States, residing at Worcester, in the county of Worcester and State of Massachusetts, have invented certain new and useful Improvements in Racing-Machines for Cutting Leather, Belting, and other Stock; and I declare the following to be a description of my said invention sufficiently full, clear, and exact to enable others skilled in the art to which it appertains to make and use the same, reference being had to the accompanying drawings, which form a part of this specification.

The objects of my present invention are to provide an improved racing-machine for stripping leather, belting, and for similar purposes; to provide a cutting-knife for racing stock or stripping leather, belting, &c., which operates with the peculiar shearing motion hereinafter explained; to provide an automatically-operating holding mechanism for retaining the stock in position while the knife is performing its cutting action and for releasing the stock after the cutting is effected; to provide an adjustable gage for facilitating the cutting of the belts or strips to the desired width; to afford means for the convenient, ready, and simultaneous adjustment of the gages for different parallel widths of belting; to provide yielding gage-pins which will permit of the strips or belting being passed over said pins by slight excess of pressure. These objects I attain by mechanism the nature, construction, and operation of which is illustrated in the drawings, and explained in the following description, the particular subject-matter claimed being hereinafter definitely specified.

Figure 1 is a front view of my improved racing-machine, the length of the machine being shown shortened to bring it within the limits of the sheet. Fig. 2 is a vertical section on line $x\ x$. Fig. 3 is a vertical section of the cutting apparatus on a somewhat larger scale. Fig. 4 is a view showing the detail of construction of the holding mechanism. Fig. 5 is a horizontal section showing plan of the operating mechanism. Fig. 6 is a back view of the knife-bar in depressed position. Fig. 7 shows the form of the cam for operating the holding mechanism. Fig. 8 is a vertical section showing the detail of construction of the gage-pin devices.

In reference to the drawings, A denotes the supporting-frame. A' is the main beam or bed-support. $A^2$ is the top beam, upon which are mounted the cutting and holding devices.

B indicates the knife-bar, which supports the blades or cutters C. Said knife-bar is arranged against the side of the beam $A^2$, its ends being mounted on cranks D and E, fixed on the ends of short shafts or rotative studs D' and E', which are supported in bearings on the beam $A^2$, and by which motion is imparted to the cutting apparatus. The adjacent surfaces of the knife-bar and beam are accurately planed, so as to slide smoothly upon each other, and the knife-bar is secured to the beam at intervals of its length by bolts $b$, which pass through slots formed in the beam $A^2$ and screw into the body of the knife-bar in a manner to permit free movement of the bar, while retaining it closely against the beam, (see Figs. 1 and 3,) said slots being formed on lines developed by the movement of the knife-bar at the positions of the respective bolts.

The short studs or shafts D' and E', which carry the cranks D and E, pass through their bearings to the opposite side of the beam $A^2$, the shaft D' being provided at its opposite end with a crank or arm, $D^2$, while shaft E' is provided with a double crank or angle lever, $E^2$, the lower arm, $f$, of which is connected by a rod, F, with the arm $D^2$, while the upper arm, $e$, is connected by a rod, G, with a crank or wrist-pin fixed in a plate, G', arranged on the forward end of the operating-shaft H.

Cranks D and E, on which the knife-bar is mounted, are relatively located so that crank D swings downward in a curve below the axis of its shaft, while crank E swings downward in a curve above the axis of its shaft, the length of movement embracing about one-quarter of a circle, (more or less,) or from the positions shown in Fig. 1 to the positions shown in Fig. 6.

The movement is imparted from the crank-shaft H through the rod G, double crank $E^2$, rod F, and cranks $D^2$ and D, the crank D having a close bearing in the end of the knife-bar, while the crank E works in a slot in the knife-bar.

With this arrangement of parts the end of the knife-bar connected with the crank D is moved downward rapidly at the first part of the crank action and slowly at the latter part, while there is imparted thereby a longitudinal movement slowly at the first part of its crank action and more rapidly at the latter part. At the same time the end of the knife-bar connected with the crank E is moved downward by the crank E', slowly at the first part of the action and more rapidly at the latter part, thereby effecting a peculiar shearing action of the knife due to the particular portions of the circular curves through which the cranks move, the end nearest the crank D first cutting into the leather and gradually shearing toward the opposite end with a draw-cut action.

Bed-support or beam A' is provided at its top with a steel plate or facing, I, across the edge of which the knife shears for cutting the stock.

Tables $a$ and $a'$, mounted on suitable brackets, are arranged at the level of the bed-plate I for supporting the stock. The bed-plate I is held to the support or beam A' by screws $i$, which pass through slots, and adjusting-screws $j$ are provided, whereby said plate can be accurately adjusted, so that its shearing-edge will meet the cutter C.

The blade or cutter C may be made in one, two, or more sections, and secured to the knife-bar by bolts $c$, which pass through slots in the blade and screw into the metal of the bar, while screws $c'$ are arranged in the flange of the knife-bar, which screw against the top of the blade to facilitate adjustment and for retaining it solidly against upward strains.

J indicates holding-bars or pressers, for retaining the stock W in position upon the bed while being cut. Said bars are attached to the lower ends of rods $J^2$, that extend through bearings on beam $A^2$, and connect with the upper arms of angle-levers K, which are fulcrumed, as at $k$, on said beam $A^2$, with their lower arms pivoted to collars $l$, arranged loosely upon a pull-rod, L, that is connected with mechanism for operating the holding devices. The collars $l$ are severally arranged in connection with a spring, $m$, and confined between two collars, $n$ and $n'$, arranged on the rod L, and firmly secured in position by set-screws, as indicated in Figs. 1 and 4, which latter figure shows the parts in position, as with the bar J depressed.

When the rod L is moved in one direction, (see Fig. 1,) the collar $n$ presses against the collar $l$ and elevates the rods $J'$ and presser-foot J, and when said rod L is moved in the opposite direction, (see Fig. 4,) the collar $n'$ and spring $m$ actuate the levers K for depressing the rods $J'$, and forcing the holding bar or feet J down upon the stock W, thereby clamping it firmly upon the bed. The springs $m$ give a yielding action independently to the respective rods $J'$, so that when either of said rods reaches solid bearing upon the stock the spring contracts to the full movement of the rod L, the collar $l$ sliding away from the collar $n$, thus bringing each of the rods down to a firm bearing regardless of irregularities in thickness of the stock under the several rods.

Rod L is connected to a lever, M, fulcrumed on the end frame of the machine, and the lower end of said lever is linked to a reciprocating rod, N, arranged through suitable bearings and provided with a stud and friction-roll that runs in the groove of a suitable cam, N', fixed on the shaft H at the back of the crank G', and by means of which the holding mechanism is operated.

Shaft H, which is supported in suitable bearings, as indicated, is provided with a bevel-gear, O, which meshes with and is operated by a pinion, P', on the driving-shaft P. The driving-pulley $P^2$ runs loose on the driving-shaft and is connected for action by a sliding-clutch, Q, the operating-fork of which, Q', is attached to the end of a reciprocating shipper-rod, R, as indicated on Fig. 5.

The shipper-rod is actuated for throwing the clutch out of action by means of a spring, S, arranged on the end of said rod and strained between the supporting-bearing and an adjustable collar fixed on the end of said rod, and said rod is actuated for throwing the clutch into mesh with the pulley by means of a rocker-shaft, T', and treadle T, which extend across the machine, the shipper-rod being connected to an arm, $T^2$, on said rocker-shaft, by means of an angle-lever, $t$, and connection $t'$, arranged in such a manner that the depression of the treadle throws the clutch into mesh, where it is retained by a latch, U, that drops behind a collar, V, fixed on the rod, thus retaining the clutch in mesh while shaft H makes one revolution, and until the latch is tripped by a suitable lug, $w$, fixed on the back of the gear O, which lug by elevating the latch permits the spring S to throw the clutch out of mesh and stops the machine. The parts are so adjusted that the stopping of the machine is effected when the wrist-pin of the crank G' and the knife-bar and holding mechanism are in elevated positions.

The rear table, $a'$, is provided with lateral guideways, in which traverse adjustable slides 4, which support gage-pins 5. Said slides are connected with bands 6, which run over sprocket-wheels 7 and 8, respectively, located at the outer ends of the table-supporting brackets, and upon a shaft, 9, arranged along the rear side of the bed-supporting beam A', (see dotted lines, Fig. 2,) which shaft is connected by suitable bevel-gears with a hand-wheel shaft, 10, which extends forward from near the end of the beam, and is provided with a hand-wheel, 11, in convenient reach of the operator, whereby said gage-pin mechanism can be readily and conveniently adjusted for changing the position of the gage-pins to a greater or less distance from the cutters. The periphery of the hand-wheel 11 may be graduated in suitable divisions to correspond with the receding movement of the gage-pins, in inches or parts of inches, so that by moving said wheel in connection with a suitable index-finger the graduations serve as a guide for placing the gage-pins at any required distance from the knife, so as to cut off strips or belts of any desired width, from one inch to three feet, more or less.

The gage-pins are preferably made as indicated in Fig. 8, the pin 5 being pivoted at its lower end, so that it can swing backward into the interior of the slide-block, and provided with a spring, 13, which presses against a lug on the back of the pin for supporting it in an upright position, as indicated, the tension of the spring being adjusted so as to give the required force for holding the pin in upright position at a given pressure, or sufficiently to act as a guide in placing the leather, while at the same time an excess of pressure against the pin will cause the spring to be depressed and the pin to drop into the slide-block, thus enabling the operator, after a strip of leather has been cut off, to force said severed strip over and beyond the pins by a quick pressure of the edge of the stock against the severed strip, the pins again coming into upright position after the strip has been forced past them.

In practice, for racing or stripping up whole skins of belting leather, the machine may be made some nine feet in length, (more or less,) and be provided with some six sets of holding-rods, J', while for racing half-skins or sides of leather the machine may be made considerably shorter and with a less number of holding-rods J'.

It will be understood that I do not confine myself to any particular length of cutting-bed or any particular number of holders, as in these respects the machine may be varied to suit the requirements of use. The size and strength of the different parts of the machine can be varied as required for light or heavy work.

In the operation of the machine the leather or stock is passed into the machine beneath the knife to the required distance, or so that its rear edge rests against the pins 5. The attendant then places his foot upon and depresses the treadle, which throws the clutch into action, causing the shaft H to rotate, when the action of the cam N' and its connections causes the pressers to descend upon the leather for holding it in place, while the crank G' and its connections effects the depression of the knife in the manner hereinbefore described, severing the strip of leather in a straight and perfect manner. As the crank G' and cam N' complete the revolution the knife is again elevated, together with the holding devices, and the lug w, on the gear O, coming in contact with the latch trips the shipping mechanism and throws off the clutch, stopping the machine. The operator then by a quick backward movement of the leather from the front of the machine forces the severed strip back over the gage-pins, and if the next strip to be severed is for a different width of belting he adjusts the pins to the proper position by turning the hand-wheel 11, and then adjusts the leather beneath the knife and again places his foot upon the treadle, and the operation is repeated.

What I claim, and desire to secure by Letters Patent, is—

1. The combination of the knife-bar for carrying the cutting blade or blades, of the supporting and actuating cranks D, disposed for operation, as set forth, whereby a peculiar shearing draw-cut is imparted to said blade, as hereinbefore described.

2. The combination of the knife-bar and its guiding-beam, of a crank, as D, having its wrist-pin fitting closely in said knife-bar, a crank, as E, having its wrist-pin fitted to a longitudinal slot in said knife-bar, shafts, as E' D', for said cranks, journaled in said beam, and having cranks at their opposite ends connected to each other by a rod, as F, and a connecting-rod, as G, and crank G', or means for partially rotating said shafts for imparting motion to said knife-bar, substantially as set forth.

3. In a machine for racing or cutting stock or belting, the combination of the beams A' and A², the knife-bar B, supported on the beam A² and carrying the cutting blade or blades C, and the adjustable facing or shear plate I, supported on the beam A', substantially as and for the purposes set forth.

4. In a machine for racing stock or stripping leather belting, the combination of a racing-cutter, a presser bar or foot for holding the stock down upon the bed, and mechanism, substantially as described, for automatically depressing said holding-bar while the knife is making its cut and elevating it when the knife is elevated, substantially as set forth.

5. The combination of the presser bar or bars J, the rods J', the angle-levers K, connected to said rod and fulcrumed, as at k, and the pull-rod L, substantially as and for the purpose set forth.

6. The combination of the pressers J, guide-rods J', angle-levers K, pull-rod L, collars l, n, and n', and springs m, substantially as and for the purpose set forth.

7. The combination, with the pull-rod L and the presser mechanism actuated thereby, of the lever M, the reciprocating bar N, having stud and roll, and the cam N', substantially as and for the purposes set forth.

8. The combination, with the knife-bar and its operating-cranks arranged for action, as set forth, of the shaft H, having crank G', the gear O, pinion P', driving-shaft P, pulley P², clutch Q, shipper-rod R, spring S, latch U, trip-lug w, treadle T, shaft T', and connections t t', substantially as shown and described.

9. In a machine for racing stock or stripping leather, the combination, with the cutting-knife, of the gage-pins 5, mounted on adjustable slides working in guideways across the rear table, substantially as and for the purpose set forth.

10. In a machine for racing or stripping leather, the combination, with the cutting-knife, of the gage-stops adjustable in guideways across the rear table, the bands 6, connected with said gage-slides, the sprocket-wheels 7 and 8, shafts 9 and 10, and hand-wheel 11, substantially as and for the purposes set forth.

11. In a machine for racing or cutting leather or belting, the combination, with the cutting-knife, of a yielding gage or pins movably connected to the gage-adjusting slide and sustained in working position by a spring or elevating device that permits said gage to give way or turn over with excess of pressure, substantially as hereinbefore described.

12. In a machine for racing stock, the combination of the supporting-bed having the face or shear plate, the racing-knife shearing across the angle of said plate, automatic holding mechanism, substantially as described, for retaining the stock upon the bed while it is cut, the adjustable yielding gage or gages at the rear of said knife, and mechanism for imparting motion to said parts, substantially as and for the purpose set forth.

13. The combination of the adjusting-slide having an interior opening, the gage-pin pivoted therein, at its lower end to turn down within said opening, and the spring pressing against said pin for returning it to upright position, substantially as shown and described.

Witness my hand this 9th day of October, A. D. 1884.

AARON FRANCIS STOWE.

Witnesses:
CHAS. H. BURLEIGH,
S. R. BARTON.